United States Patent Office 3,382,297 Patented May 7, 1968

3,382,297

POLYMER DISPERSIONS

Morice William Thompson, Maidenhead, England, assignor to Imperial Chemical Industries Limited, London, England, a corporation of Great Britain No Drawing. Filed July 20, 1964, Ser. No. 383,941
Claims priority, application Great Britain, Aug. 1, 1963, 30,582/63
4 Claims. (Cl. 260—875)

ABSTRACT OF THE DISCLOSURE

A dispersion in organic liquid of crosslinkable addition polymers, one polymer containing a group which is capable of reacting with a complementary group in another of the polymers to crosslink the polymers, each polymer being in a different part of the disperse phase. The polymer is obtained by a process of stabilised dispersion polymerization in which an ethylenically unsaturated monomer containing a first reactive group is copolymerized in an initial stage with a main monomer, and an ethylenically unsaturated monomer containing a different reactive group is polymerized in a later stage with the main monomer.

This invention relates to dispersions of addition polymers in organic liquid, the polymers containing reactive groups through which they may be crosslinked, to coating compositions based on such dispersions, and to polymer powders obtained from such dispersions.

When using solutions of addition polymers in organic liquid, for example as a basis for coating compositions, it is frequently desirable to use a polymer which, on application of the coating composition, can then be crosslinked to give a tougher and more resistant coating. This may be achieved by incorporating in the polymer a reactive group which, in the presence of another complementary reactive group in the coating composition will crosslink the chains of the polymer. The complementary reactive group may be, for example, a catalyst or a group which enters into a condensation reaction with the first. However, in solution-type coating compositions, the two types of reactive groups are in close association and this frequently leads to the composition being unstable on storage. In many cases it may be necessary to add a compound containing the complementary type of reactive group just prior to use of the composition.

We now provide a dispersion in organic liquid of crosslinkable addition polymers, one polymer containing a group which is capable of reacting with a complementary group in another of the polymers to crosslink the polymers, each polymer being in a different part of the disperse phase.

In one embodiment of the invention the dispersion comprises a mixture of two types of dispersed addition of polymer particles, one containing one type of reactive group and one containing the other complementary type of reactive group. In this case each of the two types of particles may be of a different copolymer. For example, each copolymer may be derived to a major extent from the same basic monomer but in the one case it will contain one type of reactive group derived from a minor proportion of an appropriate comonomer and in the other case will contain the other complementary type of reactive group derived from a minor proportion of another appropriate comonomer. The two types of reactive groups, being in different parts of the disperse phase, i.e., in this case in different stable polymer particles, do not come into close reactive association as would be the case if they were in solution. Consequently it is only when the dispersion is used, say in a coating composition and the particles become integrated into and lose their separate identity in a continuous film of polymer on the surface being coated, that crosslinking by reaction between the two types of groups takes place.

An improved embodiment of the invention is based on a particular method of preparing dispersions of synthetic polymers.

Dispersions of addition polymer in organic liquid may be made by polymerising ethylenically unsaturated monomer in the organic liquid to form particles of insoluble polymer provided that during the polymerisation the particles are stabilised in disperse form, for example, by having present in the organic liquid during the polymerisation a stabliser comprising a polymeric chain solvated by the organic liquid and another constituent, e.g., another polymeric chain, which becomes associated with the disperse particles. The stabiliser may itself be formed during the polymerisation by having present in solution in the organic liquid a polymeric precursor with which part of the main monomer copolymerises to form a block or graft copolymer. In this case the copolymer functions as the stabiliser, the polymeric precursor providing the solvated polymeric chains and the copolymerised monomer providing polymeric chains which are associated with the similar polymer chains of the disperse particle of polymer. In general polar polymers are dispersed in non-polar organic liquids and non-polar polymers are dispersed in polar organic liquids. Such processes are described in our British patent specification No. 941,305.

Whilst mixtures of addition polymer dispersions made by stabilised dispersion polymerization may be used generally according to this invention, we have found that further improvements can be made using such polymerisation processes. We have found that in this type of polymerisation the fine polymer particles formed in the initial stage of the polymerisation reaction then continue to grow by accretion on their surfaces. Consequently by introducing reactive groups into the polymer by polymerising in an initial stage monomer containing such a reactive group and then, in a subsequent stage, polymerising monomer devoid of such a reactive group, the reactive groups may be confined to the inner part of the stabilised polymer particles. In this way they can be temporarily shielded by the outer part of unreactive polymer from other reactive groups which may be introduced into the dispersion with the object ultimately of causing crosslinking of the polymer in an end-use thereof, the two reactive groups only coming into contact when the dispersion is, say, used as a coating composition by evaporating the liquid of the dispersion and causing the polymer particles to coalesce to form a film.

Where, therefore, the complementary reactive groups are introded into the dispersion by dispersing in the liquid phase of the dispersion different types of particle of polymers each type containing a reactive group, then, as an added precaution against premature reaction, the reactive groups of the polymer particles may be confined to the inner layer of the polymer particles by the method of stabilised dispersion polymerisation described above.

In a further and preferred embodiment of the invention, the other complementary reactive group may be incorporated in the same polymer particle as the first reactive group by a process of stabilised dispersion polymerisation in which an ethylenically unsaturated monomer containing the first reactive group is polymerised in an initial stage and an ethylenically unsaturated monomer containing a different reactive group is polymerised in a later stage. In this way, the two types of reactive groups are again located in different parts of the disperse phase, in this case in different layers of the same dispersed particles, and are kept separate until the polymer particles lose their separate identity. However, because the reactive groups are in such close proximity, a high degree of crosslinking is obtainable and where the dispersions are used in coating compositions this results in a film which has a higher gloss than that obtained in other embodiments of the invention. In a further development of this embodiment, a layer containing one reactive group may be sandwiched between layers containing a complementary reactive group.

The degree of crosslinking obtainable will be dependant on the number of groups in the polymer molecules which can be reacted. The degree of crosslinking desired will depend on the use to be made of the crosslinkable polymers. It will also depend to some extent on the molecular weight of the polymer; lower molecular weight polymers will usually be crosslinked to a higher degree than thigher molecular weight polymers. Generally, it is preferred that the crosslinkable polymers should contain from 5–75 reactive groups per molecule. Any suitable proportion may be obtained by controlling the proportion of monomer containing the reactive group in relation to the molecular weight of the final polymer to be crosslinked.

This invention can also be used to provide crosslinkable addition polymers in stable particulate form, the polymers only becoming croslinked when the powder is fused and the separate particles lose their identity. Such stable powders can be made by removing the organic liquid of the dispersion at a temperature below the softening point of the polymer particles. For example, evaporation can be carried out under reduced pressure and other suitable processes include spray-drying and fluidised bed techniques. The polymer particles may also be separated from the organic liquid by centrifuge. The dry particles may be used as such, e.g., they may be used as coating materials by application by sprayed powder coating or fluidised bed coating techniques or as moulding powders. In these cases crosslinking takes place when the particles are fused to form the coating or moulded article. They may also be used in plastisol compositions by dispersing them in a plasticiser. In this latter form they may be used as potting compounds or adhesives or may be calendered or extrusion-moulded to form sheets, etc. In these cases crosslinking takes place when the plastisols are heated and gelled.

Pigment may be incorporated in the polymer powders by dispersing pigment in the polymer dispersion prior to removal of the organic liquid.

The invention is applicable generally to dispersions of addition polymers containing appropriate reactive groups through which crosslinking can be achieved. Where the polymer dispersion is made by stabilised dispersion polymerisation as described above, major monomers suitable for copolymerisation with a minor monomer containing one type of reactive group include; esters of acrylic or methacrylic acid, styrene and its derivatives, vinyl esters, vinyl halides, vinyl ethers, alkylenes, isoprene and butadiene. Particularly useful acrylic or methacrylic esters are those of alcohols containing 1–8 carbon atoms such as methyl, ethyl, butyl, and 2-ethoxyethyl methacrylate and ethyl acrylate. One or more of such esters may be copolymerised with a higher alkyl ester such as lauryl methacrylate. Other particularly useful examples of the abovementioned monomers are α-methyl styrene, vinyl toluene, divinyl benzene, vinyl acetate, vinyl stearate, vinyl chloride, vinylidene chloride, vinyl ethers of $C_1$–$C_4$ alkanols, ethylene and propylene. These monomers may, of course, also be copolymerised with other monomers devoid of crosslinking reactive group.

In general, we prefer to use polar polymers which are sufficiently insoluble in relatively non-polar organic liquids such as aliphatic or aromatic hydrocarbons to be dispersed therein.

The reactive group by means of which crosslinking is achieved is preferably incorporated in the disperse polymer by means of a minor proportion of a comonomer containing the group, which comonomer is copolymerised with a major proportion of a monomer devoid of such a group. For example, in a stabilised dispersion polymerisation for producing a polymer containing a major proportion of a main monomer, a minor proportion of a monomer containing a reactive group may be copolymerised with the main monomer. Preferably this copolymerisation takes place in an initial stage, polymerisation then being continued using the main monomer only. Disperse polymers each containing a complementary reactive group may then be mixed. Optionally, in a later stage of the polymerisation when the monomer containing the reactive group has been copolymerised, a different monomer containing a complementary reactive group may be copolymerised with the main monomer.

Although the main monomer is preferably the same in the polymers to be crosslinked, this is not a necessary limitation. Different main monomers appropriate to the properties required of the final crosslinked polymer can be used.

The reactive groups may be introduced by monomers and used to crosslink polymers which contain them by typical reactions shown as follows:

| Reactive Group | Monomer | Complementary reactive group | Monomers |
|---|---|---|---|
| Carboxylic acid | (Meth)acrylic acid.<br>Maleic acid.<br>Alkyl hydrogen maleates.<br>Itaconic acid.<br>Citraconic acid.<br>Crotonic acid.<br>Methylene malonic acid. | Epoxide | Glycidyl (meth)acrylate.<br>Epoxyalkyl(meth)acrylate |
| | | or<br>Amine | Vinylamine.<br>Allylamine.<br>Ketimines of aminoalkyl(meth)-acrylates.<br>Dialkylaminoalkyl(meth)acrylates.<br>Vinyl pyridines. |
| or<br>Sulphonic acid | Vinyl sulphonic acid. | | |
| or<br>Phosphonic acid | Vinyl phosphonic acid. | or<br>Hydroxymethyl amides.<br>Alkoxymethyl amides.<br>Dialkylaminomethyl amides.<br>Alkylcarbonyloxymethyl amides. | N-hydroxymethyl(meth)acrylamides.<br>Alkoxymethyl(meth)acrylamides.<br>Dialkylaminomethylacrylamides.<br>Alkylcarbonyloxymethylacrylamides. |
| Anhydride | (Meth)acrylic anhydride<br>Maleic anhydride. | Epoxide | Glycidyl(meth)acrylate.<br>Epoxyalkyl(meth)acrylate. |
| | | or<br>Amines | Vinylamine.<br>Allylamine.<br>Ketimines of aminoalkyl(meth)-acrylates. |
| | | or<br>Hydroxyl | Hydroxyalkyl(meth)acrylates.<br>Allyl alcohol. |

| Reactive Group | Monomer | Complementary reactive group | Monomers |
|---|---|---|---|
| Carboxylic acid chloride or Sulphonic acid chloride. | (Meth)acrylylchloride. | Amine | Allylamine. Vinylamine. Ketimines of aminoalkyl(meth)-acrylates. |
| Reactive esters | Cyanomethylacrylate. Alkylcarbonyloxymethyl acrylate. | Amine | Allylamine. Vinylamine. |
| Hydroxyl group | Hydroxyalkyl(meth)acrylates. Allyl alcohol. Partially hydrolysed vinyl acetate (co)polymer. | Epoxide | Glycidyl(meth)acrylate. Epoxyalkyl(meth)acrylate. |
| | | or Isocyanate | Vinyl isocyanate. Monoadducts of polyisocyanate with hydroxyalkyl(meth)acrylates, e.g. toluene diisocyanate and $\beta$-hydroxypropyl methacrylate. |
| | (+ acid catalyst) | or Hydroxymethylamides | Hydroxymethyl(meth)acrylamide. |
| | | or Alkoxymethylamides | Alkoxymethyl(meth)acrylamide. |
| | | or Dialkylaminomethyl amides | Dialkylaminomethyl(meth)-acrylamide. |
| | | or Alkylcarbonyloxymethyl amides. | Alkylcarbonyloxymethyl(meth) acrylamide. |
| Epoxide | Glycidyl(meth)acrylate. Epoxyalkyl(meth)acrylate. | Amines | Allylamine. Vinylamine. Ketimines of aminoalkyl(meth)-acrylates. |
| Isocyanate and masked isocyanates | Vinyl isocyanate. Monoadducts of polyisocyanates with hydroxyalkyl(meth)acrylates. | Amines | Alkylamine. Vinylamine. Ketimines of aminoalkyl(meth)-acrylates. |
| | | or Compounds containing reactive hydrogen. | (Meth)acrylylacetone. |
| Reactive chlorine compounds | Vinyl-$\beta$-chlorethyl sulphone. Monoadducts of cyanuric chloride with hydroxyalkyl(meth)acrylates or allyl alcohol, or allylamine or vinylamine. | Amines | Allylamine. Vinylamine. |
| | | or Hydroxyl | Allyl alcohol. Hydroxyalkyl(meth)acrylates with or without tertiary amine catalysts. |

The choice of any particular pair of reactive groups will to a large extent depend on the end use of the dispersion.

Where, for example, the dispersion is to be used as the basis of a coating composition the choice of reactive groups, and indeed the nature of the polymers themselves, will depend on the coating process and the articles to be coated. For example, in coating motor cars where a hard, resistant finish of high gloss is required, the polymer may well be one containing a major proportion of poly(methyl methacrylate) which is a relatively hard polymer and during application the coating will be force-dried or stoved. The force-drying or stoving not only assists in evaporation of the organic liquid but also causes the polymer particles to integrate and flow out into a smooth, highly glossy film. In this type of coating process, therefore, one can use crosslinking groups which readily react at the elevated temperatures reached during film integration.

On the other hand, if the coating composition is a decorative finish for use at ambient temperature, then the crosslinking groups must be reactive at room temperature. In such a finish, the polymer used is a soft one, e.g., a vinyl acetate copolymer so that the polymer particles will integrate at room temperature on evaporation of the organic liquid from the dispersion. Crosslinking at this temperature may be obtained by use of the following combinations of reactive groups:

Isocyanate plus amine or hydroxyl.
Acid groups plus amine.
Reactive chlorine plus hydroxyl or amine plus tertiary amine catalyst.

Where the dispersion is to be converted to a powder then the disperse polymer will be a relatively hard one so that the particles will not integrate during separation from the organic liquid of the disperson. The use of such powders, for example, as moulding powders or coating powders or in plastisols will involve heat to cause integration and consequently the crosslinking groups may be selected with a view to reaction at elevated temperatures.

The invention is illustrated by the following examples in which all parts are by weight.

EXAMPLE 1

In this example a polymer dispersion is made by stabilised dispersion polymerisation using a precursor with which part of the monomer copolymerises to form a stabilising block or graft copolymer. The precursor is a polylauryl methacrylate/glycidyl methacrylate copolymer esterified with methacrylic acid to attach a vinyl group with which the monomer can copolymerise. The following materials were charged to a reaction vessel:

| | Parts |
|---|---|
| 33% solution in butyl acetate of stabiliser precursor | 66.3 |
| Methyl methacrylate | 63.8 |
| Methacrylic acid | 1.2 |
| Petroleum ether (B.P. 70–90° C.) | 319.0 |
| Petroleum ether (B.P. 140–160° C.) | 93.0 |
| Azodiisobutyronitrile | 1.0 |

and heated to boiling. The distilling vapours were cooled and returned to the flask by separate entry. After 30 minutes 3.2 parts of a 10% solution of primary octyl mercaptan in petroleum spirit were added. The following mixture was fed over 2 hours into the returning cold distillate.

| | Parts |
|---|---|
| Butyl methacrylate | 75.0 |
| Methyl methacrylate | 201.2 |
| Methacrylic acid | 8.7 |
| Azodiisobutyronitrile | 0.95 |
| 10% solution of primary octyl mercaptan | 5.4 |

This was followed by the feeding of the following mixture into the cold returning distillate over one hour.

| | Parts |
|---|---|
| Butyl methacrylate | 25.0 |
| Methyl methacrylate | 100.0 |
| Butoxymethyl acrylamide | 25.0 |
| Azodiisobutyronitrile | 0.25 |
| 10% solution of primary octyl mercaptan | 1.8 |

After the addition, the reaction mixture was boiled for 30 minutes, cooled and filtered to remove any very large particles. The latex had solids of 54% and the reduced viscosity of the disperse polymer (as determined in ethylene dichloride 95:absolute alcohol 5 at 25° C.) was 0.48. This dispersion was stable on storage.

Films of the plasticised latex were stoved at 130° C. for half an hour and 150° C. for half an hour. Attempts to extract the stoved films with solvents showed them to be highly crosslinked as a result of reaction between the carboxyl and butoxymethylacrylamide groups. Films made from pigmented plasticised latex were glossly and solvent-resistant.

A comparable preparation in which both the methacrylic acid and butoxymethyl acrylamide were added in the same feed, gave a gel indicating that crosslinking had occurred prematurely.

EXAMPLE 2

A dispersion was prepared as in Example 1 except that the second and third stages were replaced by a single stage:

| | Parts |
|---|---|
| Stabiliser precursor (as in Example 1) | 66 |
| Methyl methacrylate | 60 |
| Petroleum ether (B.P. 70–90° C.) | 300 |
| Petroleum ether (B.P. 140–160° C.) | 90 |
| Azodiisobutyronitrile | 1 |

were heated to boiling. The distilling vapours were cooled and returned to the flask by separate entry. After 30 minutes 3.2 parts of a 10% solution of primary octyl mercaptan in petroleum spirit were added. The following mixture was fed over 2 hours into the returning cold distillate.

| | Parts |
|---|---|
| Methyl methacrylate | 408 |
| Methacrylic acid | 32 |
| Azodiisobutyronitrile | 0.5 |
| 10% solution of primary octyl mercaptan | 7.2 |

Another siimlar dispersion was prepared except that the methacrylic acid was replaced by butoxymethylacrylamide.

Equal parts of the two dispersions were blended together and after adding plasticiser and dispersed pigment, films of the composition were stoved for half an hour at 130° C. Glossy, solvent-resistant crosslinked films were obtained. In comparison, stoved films of the unblended dispersions were largely soluble in acetone.

EXAMPLE 3

A mixture of:

| | Parts |
|---|---|
| Stabiliser precursor (30% solution in heptane) | 100 |
| Petroleum ether (B.P. 70–90° C.) | 600 |
| Azodiisobutyronitrile | 8 |
| Vinyl acetate | 284 |

was heated under reflux for 50 minutes when it became opaque. After heating for a further hour the following charge was fed in over half an hour:

| | Parts |
|---|---|
| Vinyl acetate | 84 |
| Azodiisobutyronitrile | 3 |
| Methyl hydrogen maleate | 2 |

The following charge was then fed in over 1½ hours:

| | Parts |
|---|---|
| Vinyl acetate | 170 |
| Butoxymethylacrylamide | 50 |
| Azodiisobutyronitrile | 5 |

After a further hour reflux the dispersion was cooled and filtered to give a fine particle latex of 53% solids. The latex was used to give films using an aliphatic/aromatic hydrocarbon (boiling range 155–195° C.) as a coalescing solvent. The films were stoved at 130° C./½ hr. and 150° C./½ hr. These films were hard and solvent-resistant. Extraction studies on the films showed them to be largely crosslinked.

As a variation on this example, the order of addition of the two charges can be reversed. The films obtained are substantially the same.

EXAMPLE 4

The following materials were charged to a stainless steel pressure pot:

| | Parts |
|---|---|
| Vinyl chloride | 600 |
| Peroxyisopropyl dicarbonate | 3 |
| Stabiliser precursor (allylated polylauryl methacrylate) | 50 |
| Butoxymethylacrylamide | 10 |
| Petroleum fraction (B.P. 140–170° C. aromatic free) | 100 |

After heating at 60–70° C. for 5 hours a latex was obtained. Then 10 parts of methyl hydrogen maleate were added and the heating continued for 45 minutes. After cooling and venting unreacted monomer, a dispersion of 60% solids was obtained. Coating compositions made by adding a dispersion of pigment in plasticiser to the dispersion gave tough, crosslinked films on stoving.

EXAMPLE 5

Example 4 was repeated, but this time the ethyl hydrogen maleate was added with the vinyl chloride and the butoxymethylacrylamide was added 5½ hours after the main reaction. After heating for a further 40 minutes a slightly thixotropic latex of 60% solids was obtained. In this dispersion the location of the two types of reactive groups in the disperse particles was the opposite to that of Example 4.

When plasticised and pigmented, good solvent-resistant crosslinked films were produced on stoving.

EXAMPLE 6

Both Examples 4 and 5 were repeated using the more soluble butoxymethyl methacrylamide in place of butoxymethyl acrylamide. Similar results were obtained.

EXAMPLE 7

The procedure as described in Example 1 was repeated using the following dry reactants and organic liquids:

Charge I in reaction vessel

| | Parts |
|---|---|
| 33% solution in butyl acetate of stabiliser precursor | 66.3 |
| Methyl methacrylate | 60.0 |
| 2-hydroxypropyl methacrylate | 5.0 |
| Petroleum ether (B.P. 70–90° C.) | 319.0 |
| Petroleum ether (B.P. 140–160° C.) | 93.0 |
| Azodiisobutyronitrile | 1.0 |

Charge II

| | Parts |
|---|---|
| 10% primary octyl mercaptan solution | 3.2 |

Charge III

| | Parts |
|---|---|
| Butyl methacrylate | 75.0 |
| Methyl methacrylate | 185.0 |
| Reaction product of 2-hydroxypropyl methacrylate with toluene diisocyanate | 25.0 |
| Azodiisobutyronitrile | 0.95 |
| 10% primary octyl mercaptan solution | 5.4 |

The reaction mixture was then allowed to reflux for 5 minutes before Charge IV was added:

| | Parts |
|---|---|
| Butyl methacrylate | 25.0 |
| Methyl methacrylate | 100.0 |
| 2-hydroxypropyl methacrylate | 25.0 |
| Azodiisobutyronitrile | 0.25 |
| 10% solution of primary octyl mercaptan | 1.8 |

The dispersion contained 54% solids. After addition of plasticiser, the dispersion was spread as a film and force-dried at 90° C. Crosslinking took place by reaction of isocyanate groups introduced in Charge III with the hydroxyl groups introduced in Charges I and IV. The film was then subtsantially insoluble in solvents.

EXAMPLE 8

The procedure followed was similar to that of Example 1 using dry reactants and solvents:

Charge I in reaction vessel

| | Parts |
|---|---|
| Stabiliser precursor (30% solution in petrol) | 4.0 |
| Methyl methacrylate | 180.0 |
| 2-hydroxyethyl methacrylate | 20.0 |
| Azodiisobutyronitrile | 0.6 |
| 10% solution of primary octyl mercaptan | 15.2 |
| Petroleum ether (B.P. 70–90° C.) | 1,080.0 |

The reaction mixture was heated to reflux with stirring for one hour. The following Charge II was then fed in over 1½ hours.

| | Parts |
|---|---|
| Stabiliser precursor (33% solution in petrol) | 36.0 |
| Methyl methacrylate | 800.0 |
| 2-hydroxypropyl methacrylate/toluene diisocyanate adduct | 100.0 |
| Azodiisobutyronitrile | 2.7 |
| 10% primary octyl mercaptan solution | 68.4 |

5 minutes after completion of addition of Charge II the following Charge III was fed in over 1½ hours:

| | Parts |
|---|---|
| Methyl methacrylate | 820.0 |
| 2-hydroxyethyl methacrylate | 80.0 |
| Azodiisobutyronitrile | 2.7 |
| 10% solution of primary octyl mercaptan | 68.4 |

After the reaction mixture had been refluxed for one hour the polymer content was 62%. Due to the use of a lower proportion of stabiliser, the polymer particles were larger and although, during polymerisation, the polymer particles were stabilised in that they did not coagulate to form a sticky mass or adhere to the walls and stirrer of the reaction vessel, they settled out of the organic liquid when polymerisation was completed and the stirrer was stopped. The dispersion was suitable for drying on trays, by spray, or by fluidised bed techniques to give a fine powder. The powder was used as a moulding powder which crosslinked on heating to above the melting point of the polymer. The powder was also converted to a plastisol with plasticisers such as isobutyl methylcyclohexanyl phthalate, dicyclohexyl phthalate, dioctyl phthalate and mixtures of these. It is important, however, that little or no plasticiser attack should take place on storage at room temperature. These plastisols were useful for giving thick resistant coatings and as potting compounds.

EXAMPLE 9

The procedure was similar to that of Example 1.

Charge I

| | Parts |
|---|---|
| 33% solution of stabiliser precursor in butyl acetate | 66.3 |
| Methyl methacrylate | 60.0 |
| Methyl isobutyl ketimine of aminoethyl methacrylate | 20.0 |
| Petroleum ether (B.P. 70–90° C.) | 319.0 |

| | Parts |
|---|---|
| Petroleum ether (B.P. 140–160° C.) | 93.0 |
| Azodiisobutyronitrile | 1.0 |

Charge II

| | |
|---|---|
| 10% primary octyl mercaptan | 3.2 |

Charge III

| | |
|---|---|
| Butyl methacrylate | 75.0 |
| Methyl methacrylate | 185.0 |
| Methacrylyl chloride | 25.0 |
| Azodiisobutyronitrile | 0.95 |
| 10% solution of primary octyl mercaptan | 5.4 |

After addition of Charge III the reaction mixture was allowed to reflux for 5 minutes before Charge IV was added.

Charge IV

| | Parts |
|---|---|
| Butyl methacrylate | 25.0 |
| Methyl methacrylate | 100.0 |
| Methyl isobutyl ketimine of aminoethyl methacrylate | 30.0 |
| Azodiisobutyronitrile | 0.25 |
| 10% solution of primary octyl mercaptan | 1.8 |

After further refluxing for 30 minutes the mixture was cooled and filtered. Plasticiser was added to the dispersion and when films were spread and stoved at 130° C. for half an hour, tough crosslinked films were obtained as a result of reaction between the acid chloride groups introduced in Charge III and the amine groups introduced in Charges I and IV.

EXAMPLE 10

Example 9 was repeated but the methacrylyl chloride in Charge III was replaced by glycidyl methacrylate.

The plasticised films when stoved for one hour at 127° C. using butyl phosphoric acid catalyst gave highly crosslinked films as a result of reaction between the epoxide and amine groups.

EXAMPLE 11

A dispersion similar to that described in Example 7 was made except that the reaction product of 2-hydroxypropyl methacrylate and toluene diisocyanate in Charge III was replaced by 2-hydroxypropyl methacrylate.

This dispersion was blended with a latex made in a similar way except that all the 2-hydroxypropyl methacrylate was replaced by the adduct of hydroxypropyl methacrylate with toluene diisocyanate.

The dispersion containing the admixed disperse polymer particles was plasticised with dimethylcyclohexanyl phthalate and isobutyl methylcyclohexanyl phthalate. On stoving at 127° C. for half an hour or 150° C. for half an hour films were obtained which were highly resistant to solvent. Crosslinking resulted from reaction of the hydroxyl groups in one type of particle with isocyanate groups in the other type of particle.

EXAMPLE 12

Example 7 was repeated except that the reaction product of toluene diisocyanate and hydroxypropyl methacrylate in Charge III was replaced by the mono-reaction product of cyanuric chloride and β-hydroxyethyl methacrylate.

The dispersion was plasticised by addition of butyl benzyl phthalate and isobutyl methylcyclohexanyl phthalate and catalysed with dodecyldimethylamine 0.5% on polymer. On force-drying at 100° C. a film of the dispersion became integrated and highly crosslinked. Crosslinking was due to reaction between the reactive chlorine groups introduced in Charge III and the hydroxyl groups introduced in Charges I and IV.

EXAMPLE 13

The procedure as described in Example 3 was repeated using the following dry reactants and organic liquids.

Charge I

| | Parts |
|---|---|
| Stabiliser precursor (30% solution in heptane) | 100 |
| Petroleum ether (B.P. 70–90° C.) | 600 |
| Azodiisobutyronitrile | 8 |
| Vinyl acetate | 177 |
| Hydroxyethyl acrylate/toluene diisocyanate adduct | 50 |
| Dibutyl maleate | 57 |

Charge II

| | |
|---|---|
| Vinyl acetate | 68 |
| Dibutyl maleate | 17 |
| Azodiisobutyronitrile | 3 |

Charge III

| | |
|---|---|
| Vinyl acetate | 148 |
| Hydroxyethyl acrylate | 25 |
| Dibutyl maleate | 44 |
| Azodiisobutyronitrile | 5 |

A 53% solids dispersion was obtained to which coalescing solvent was added as in Example 3 to aid particle integration on application. On spreading a coating of the dispersion, the organic liquids evaporated at room temperature and the particles of polymer, which were much softer than in Example 3 due to the copolymerisation of dibutyl maleate, coalesced and became integrated into a film. Crosslinking then commenced and after a few hours at room temperature the polymeric film became highly crosslinked.

I claim:

1. A process for the manufacture of a stabilized dispersion in an organic liquid of crosslinkable polymer insoluble in said organic liquid which comprises copolymerizing ethylenically unsaturated monomers in said organic liquid in the presence of a dispersion stabilizer selected from the group consisting of block and graft copolymers of which one component is solvated by said organic liquid, and another component is compatible with said copolymer, the polymerization comprising an initial stage (i) wherein there are copolymerized at least one main ethylenically unsaturated monomer and a first ethylenically unsaturated comonomer which copolymerizes with said main monomer and which contains a reactive cross-linking group, and a subsequent stage (ii) wherein when all said first comonomer has been polymerized a second ethylenically unsaturated comonomer is copolymerized with the residue or a further addition of said main monomer and which contains a complementary reactive crosslinking group capable of reacting with the reactive group of first comonomer, said main monomer or monomers being devoid of groups which will crosslink with either of the comonomers.

2. A process as set forth in claim 1 in which after all said first ethylenically unsaturated monomer has polymerized, said main monomer is polymerized alone before adding said second ethylenically unsaturated monomer.

3. A stabilized dispersion in an organic liquid of particles of cross-linkable polymer insoluble in said organic liquid produced by copolymerizing ethylenically unsaturated monomers in said organic liquid in the presence of a dispersion stabilizer selected from the group consisting of block and graft copolymers of which one component is solvated by said organic liquid and another component is compatible with said copolymer, the polymerization comprising an initial stage (i) wherein there are copolymerized at least one main ethylenically unsaturted monomer and a first ethylenically unsaturated comonomer which copolymerizes with said main monomer and which contains a reactive crosslinking group, and a subsequent stage (ii) wherein when all said first comonomer has been copolymerized a second ethylenically unsaturated comonomer is copolymerized with the residue or a further addition of said main monomer and which contains a complementary reactive crosslinking group capable of reacting with the reactive group of first comonomer, said main monomer or monomers being devoid of groups which will crosslink with either of the comonomers.

4. A dispersion as set forth in claim 3 in which the crosslinkable polymers contain 5–75 reactive crosslinking groups per molecule.

References Cited

UNITED STATES PATENTS

| | | | |
|---|---|---|---|
| 3,236,914 | 2/1966 | Murdock et al. | 260—857 |
| 3,261,788 | 7/1966 | Carter et al. | 260—875 |
| 3,270,100 | 8/1966 | Jolkovski et al. | 264—4 |
| 3,297,623 | 1/1967 | Knapp et al. | 260—879 |
| 3,299,176 | 1/1967 | Longworth | 260—897 |
| 3,299,184 | 1/1967 | Whitworth et al. | 260—897 |

MURRAY TILLMAN, *Primary Examiner.*

T. G. FIELD, C. J. SECCURO, *Assistant Examiners.*